(12) United States Patent
Takahashi

(10) Patent No.: US 7,702,218 B2
(45) Date of Patent: Apr. 20, 2010

(54) IMAGE RECORDING APPARATUS AND SEMICONDUCTOR DEVICE

(75) Inventor: Tetsu Takahashi, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 1570 days.

(21) Appl. No.: 10/080,564

(22) Filed: Feb. 25, 2002

(65) Prior Publication Data

US 2002/0141739 A1  Oct. 3, 2002

(30) Foreign Application Priority Data

Mar. 29, 2001 (JP) ............................. 2001-097136

(51) Int. Cl.
| | | |
|---|---|---|
| H04N 7/26 | (2006.01) | |
| H04N 9/79 | (2006.01) | |
| H04N 5/93 | (2006.01) | |
| H04N 5/91 | (2006.01) | |
| H04N 5/95 | (2006.01) | |
| H04N 5/00 | (2006.01) | |
| H04N 7/14 | (2006.01) | |
| H04N 7/08 | (2006.01) | |
| H04N 5/14 | (2006.01) | |
| G11B 27/02 | (2006.01) | |
| G11B 5/09 | (2006.01) | |
| G11B 5/02 | (2006.01) | |
| G11B 7/28 | (2006.01) | |

(52) U.S. Cl. ........................... 386/111; 386/35; 386/52; 386/66; 386/68; 386/70; 386/91; 386/92; 386/98; 386/109; 386/112; 386/124; 386/125; 348/14.13; 348/484; 348/571; 360/13; 360/32; 360/39; 360/40; 360/55; 369/84

(58) Field of Classification Search ................. 341/50; 348/14.13, 521, 522, 542, 484, 571, E7.09, 348/E7.069, E5.007; 360/13, 15, 32, 39, 360/40, 55, 48; 369/84, 30.23, 44.23, 47.33, 369/47.54; 386/35, 45, 46, 52, 66, 68, 70, 386/72, 82, 91, 92, 98, 109, 111, 112, 124, 386/125, 126, 104, E9.009; 345/204; 358/426.05; 375/240.05, E7.167, E7.198, E7.235, E7.238; 714/755; 708/108

See application file for complete search history.

(56) References Cited

U.S. PATENT DOCUMENTS

| | | | | |
|---|---|---|---|---|
| 4,253,143 A | * | 2/1981 | Onodera et al. | ............. 708/108 |
| 5,212,678 A | * | 5/1993 | Roth et al. | ............... 369/47.33 |
| 5,225,909 A | * | 7/1993 | Koizumi | ...................... 348/571 |
| 5,289,190 A | * | 2/1994 | Shimoda et al. | ............... 341/50 |
| 5,504,759 A | * | 4/1996 | Inoue et al. | .................. 714/755 |
| 5,563,961 A | * | 10/1996 | Rynderman et al. | ......... 382/239 |
| 5,694,332 A | * | 12/1997 | Maturi | ........................ 700/94 |

(Continued)

FOREIGN PATENT DOCUMENTS

JP          9-284715          10/1997

(Continued)

*Primary Examiner*—Thai Tran
*Assistant Examiner*—Syed Y Hasan

(57) ABSTRACT

A coding/decoding part performs codes and decodes a given signal in one of a plurality of coding/decoding modes of different bit rates; and a control part sets a predetermined bit rate to be applied by the coding/decoding part in case a given signal is output after being coded and decoded by said coding/decoding part without storage thereof in a predetermined recording medium.

20 Claims, 15 Drawing Sheets

U.S. PATENT DOCUMENTS

| | | | |
|---|---|---|---|
| 6,219,311 B1 * | 4/2001 | Mitsuno | 369/30.23 |
| 6,226,443 B1 * | 5/2001 | Morioka et al. | 386/82 |
| 6,240,244 B1 * | 5/2001 | Ikeda | 386/125 |
| 6,397,000 B1 * | 5/2002 | Hatanaka et al. | 386/98 |
| 6,538,656 B1 * | 3/2003 | Cheung et al. | 345/519 |
| 2001/0009417 A1 * | 7/2001 | Asai et al. | 345/204 |
| 2002/0136538 A1 * | 9/2002 | Chen | 386/111 |
| 2003/0014475 A1 * | 1/2003 | Komori | 709/200 |
| 2003/0120942 A1 * | 6/2003 | Yoshida et al. | 713/193 |

FOREIGN PATENT DOCUMENTS

| | | |
|---|---|---|
| JP | 10-136309 | 5/1998 |
| JP | 11-073731 | 3/1999 |

* cited by examiner

STATE TRANSITION DIAGRAM

① RECORD FILE LIST

| FILE NAME | RECORD START DATE /TIME | RECORD LENGTH | RECORD MODE |
|---|---|---|---|
| FILE 1 | 00/02/19  21:00 | 2:00 | HQ |
| FILE 2 | 00/02/25  19:00 | 1:35 | LP |
| FILE 3 | 00/03/09  10:00 | 2:00 | HQ |

FIG.13A

② B FILE EDIT

STORABLE TIME ZONE

00/03/09  12:00 - 00/03/09  20:00

SET STORAGE TIME ZONE

| RECORD START DATE /TIME | RECORD END DATE /TIME |
|---|---|
| 00/03/09  18:00 | 00/03/09  19:00 |
| 151 | 152 |

FIG.13B

③ RECORD FILE LISTS

| FILE NAME | RECORD START DATE /TIME | RECORD LENGTH | RECORD MODE |
|---|---|---|---|
| FILE 1 | 00/02/19  21:00 | 2:00 | HQ |
| FILE 2 | 00/02/25  19:00 | 1:35 | LP |
| FILE 3 | 00/03/09  10:00 | 2:00 | HQ |
| FILE 4 | 00/03/09  18:00 | 1:00 | LP |

| | FILE NAME | RECORD START DATE /TIME | RECORD END DATE /TIME | RECORD MODE | STATE A/B |
|---|---|---|---|---|---|
| 1 | FILE 1 | 2000/2/19 21:00 | 2000/2/19 23:00 | HQ | A |
| 2 | FILE 2 | 2000/2/25 19:00 | 2000/2/25 20:35 | LP | A |
| 3 | FILE 3 | 2000/3/9 10:00 | 2000/3/9 12:00 | HQ | A |
| 4 | FILE 4 | 2000/3/9 12:00 | 2000/3/9 20:00 | LP | B |

FIG.14B

| | FILE NAME | RECORD START DATE /TIME | RECORD END DATE /TIME | RECORD MODE | STATE A/B |
|---|---|---|---|---|---|
| 1 | FILE 1 | 2000/2/19 21:00 | 2000/2/19 23:00 | HQ | A |
| 2 | FILE 2 | 2000/2/25 19:00 | 2000/2/25 20:35 | LP | A |
| 3 | FILE 3 | 2000/3/9 10:00 | 2000/3/9 12:00 | HQ | A |
| 4 | FILE 4 | 2000/3/9 19:00 | 2000/3/9 20:00 | LP | A |

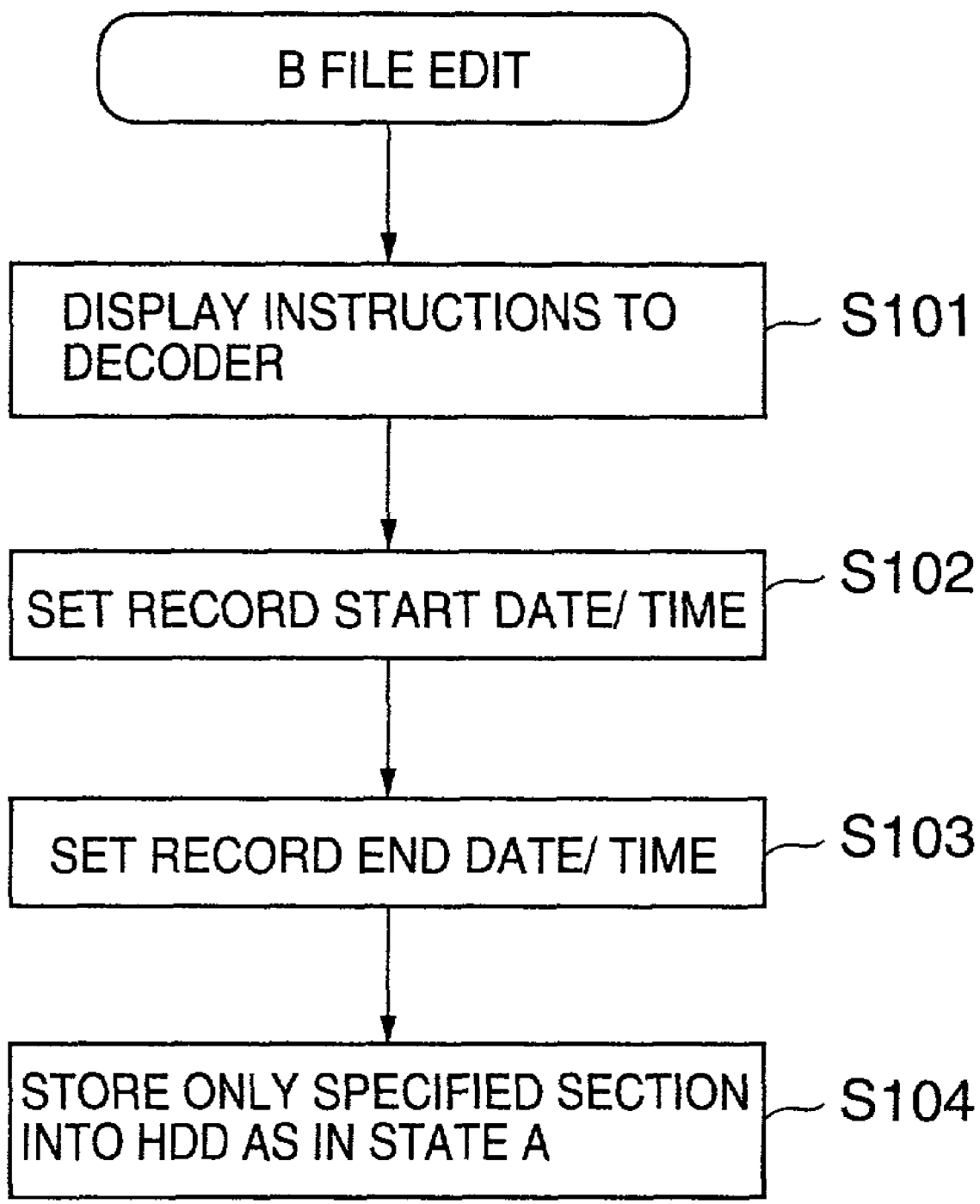

IMAGE RECORDING APPARATUS AND SEMICONDUCTOR DEVICE

BACKGROUND OF THE INVENTION

1. Field of the Invention

The present invention relates to an image recording apparatus including a recording medium which stores an image signal and a voice signal, and, in particular, to an image recording apparatus which has coding/decoding function for the image signal or voice signal. The present invention also relates to a semiconductor device for embodying functions of this image recording apparatus.

2. Description of the Related Art

In recent years, image recording apparatuses which encode and compress input image signals (or video signals) and audio signals into MPEG 2 PS or TS data, store them, and, then, decode and decompress them have been put into the market of public welfare apparatuses. Such image recording apparatuses employ magnetic-disk recording media, or, recently, DVDs, as data recording media. In particular, an apparatus using a magnetic-disk recording medium is called a HDD recorder.

Generally, this type of image recording apparatus can perform recording/reproducing by a plurality of conditions, such as a high-quality mode, a standard mode, a low-quality (but long time recordable) mode, and so forth, by controlling data coding conditions, appropriately. Furthermore, as the seek time is shortened for such a recording medium as magnetic-disk recording medium, a so-called "time-shift function" is attained in which an arbitrary position of an image file can be reproduced while the same file is recorded onto the disk recording medium.

Such an image recording apparatus is generally connected both to a source external apparatus such a DVD player or the like from which image signal and audio signal to be recorded is input via an input terminal, and, to an output external apparatus such as a TV set or the like through which reproduced image signal and audio signal are output via an output terminal.

Then, there is a case where, the image recording apparatus inputs thereto the image signal and audio signal input from the source external apparatus, and, then, outputs these signals to the output external apparatus without storing the signals therein. In such a case, when the image recording apparatus has a provision (special path) for bypassing the input image and audio signals to the output terminal without coding, compressing, storing, decompressing and decoding the signals, the input signals are output as they are.

However, when the image recording apparatus does not have such a provision (special path), the input signals are output after being once coded, compressed, stored, decompressed and decoded. In such a case, when the coding/decoding bit rate has been set relatively lower (for example, on the above-mentioned low-quality mode) in the recording apparatus, the thus-output signals after being thus coded, stored and decoded are those somewhat degraded in quality. Thereby, the quality in image and audio thus output via the output external apparatus is not a satisfactory one.

SUMMARY OF THE INVENTION

An object of the present invention is to solve the above-mentioned problem, and, to provide an image recording apparatus by which, even when input signals are output without storage thereof, the signal quality is not degraded problematically.

According to the present invention, a coding/decoding part performs codes and decodes a given signal in one of a plurality of coding/decoding modes of different bit rates; and a control part sets a predetermined bit rate to be applied by the coding/decoding part in case a given signal is output after being coded and decoded by said coding/decoding part without storage thereof in a recording medium.

Thereby, even in case where input image signal is output without storage thereof, degradation in image quality may be effectively reduced.

BRIEF DESCRIPTION OF THE DRAWINGS

Other objects and further features of the present invention will become more apparent from the following detailed description when read in conjunction with the following accompanying drawings:

FIGS. 13A, 13B and 13C illustrate file states A and B according to the present invention;

FIGS. 14A and 14B illustrate an example of files stored in the HDD; and

FIG. 15 is a flow chart which shows a B file edit operation of the image recording apparatus shown in FIG. 5.

DESCRIPTION OF THE PREFERRED EMBODIMENT

Figure 1:
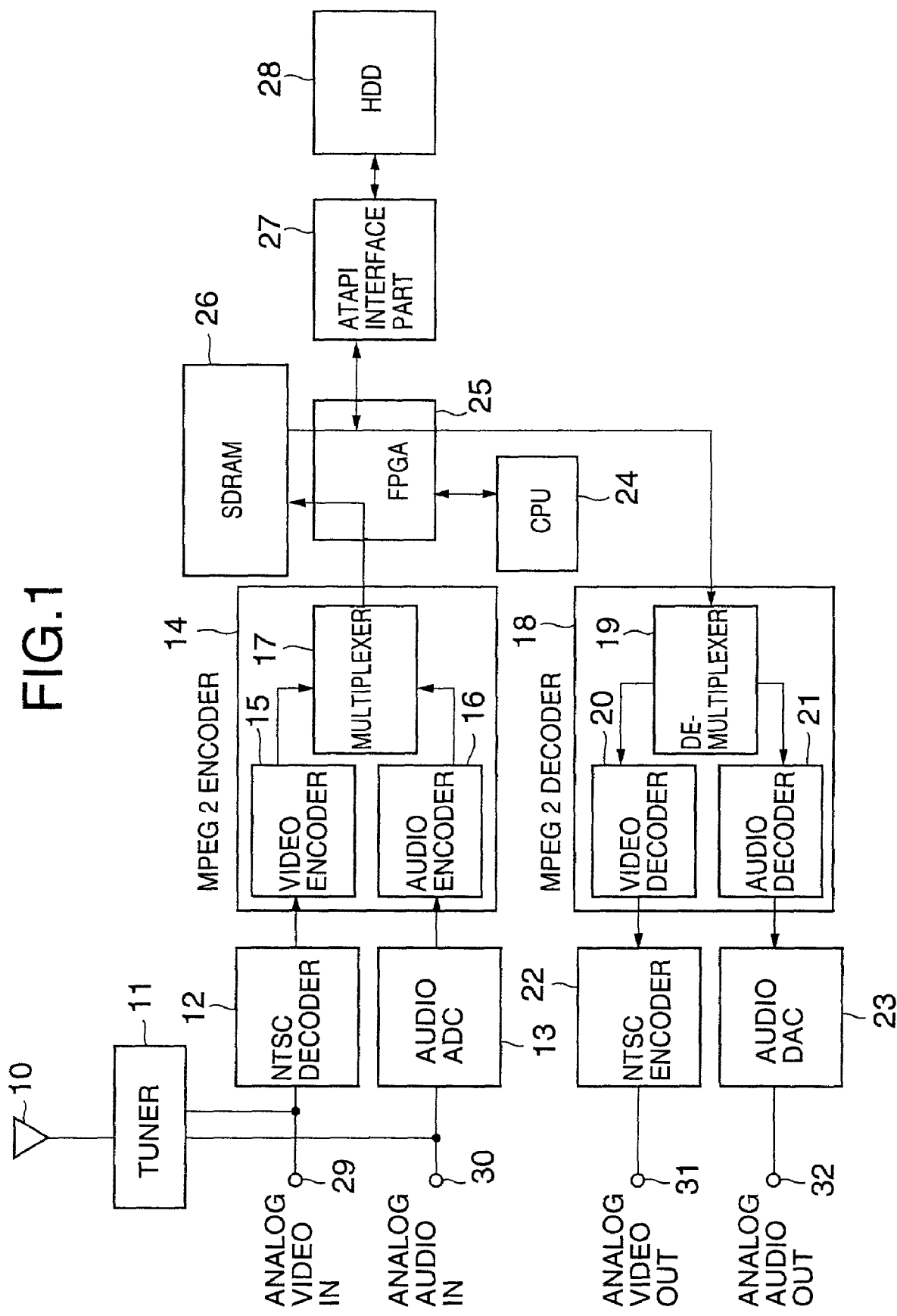
FIG. 1 is a block diagram showing a configuration of an image recording apparatus according to one embodiment of the present invention.

FIG. 1 is a block diagram showing an image recording apparatus according to one embodiment of the present invention.

The image recording apparatus includes a tuner 11, which is connected to an antenna 10, an NTSC decoder 12, an audio A-D converter (ADC) 13, an MPEG 2 encoder 14, an MPEG 2 decoder 18, an NTSC encoder 22, and an audio D-A converter (DAC) 23. The tuner 11, NTSC decoder 12, audio A-D converter 13, and MPEG 2 encoder 14 constitute an input system of the image recording apparatus, while the MPEG 2 decoder 18, NTSC encoder 22, and audio D-A converter 23 constitute an output system thereof. An analog image signal from the tuner 11 is given to the NTSC decoder 12 from the outside through an input terminal 29, and an analog audio signal is given to the audio A-D converter 13 through an input terminal 30. An analog image signal which the NTSC encoder 22 outputs is provided to an external apparatus, such as a television set, through an output terminal 31. An analog audio signal which the audio D-A converter 23 outputs is provided to the external apparatus through an output terminal 32.

The MPEG 2 encoder 14 has a video encoder 15, an audio encoder 16, and a multiplexer 17. The MPEG 2 decoder 18 has a de-multiplexer 19, a video decoder 20, and an audio decoder 21.

Further, the image recording apparatus has a CPU 24, an FPGA (Field Programmable Gate Array, referred to as a controller, hereinafter) 25, an SDRAM (Synchronous Dynamic Random Access Memory) 26, an ATAPI (ATA Packet Interface, referred to as an interface part, hereinafter) 27, and an HDD (Hard Disk Drive) 28.

The video encoder 15 of the MPEG 2 encoder 14 carries out coding and compressing of the image signal decoded by the NTSC decoder 12, and outputs it to the multiplexer 17. The compression form of, for example, MPEG 2-Video is used for this coding and compressing. The audio encoder 16 carries out coding and compressing of the digital audio signal output from the audio A-D converter 13, and provides it to the multiplexer 17. The compression form of MPEG 1 Audio Layer 2 is used for this coding and compressing. The multiplexer 17 multiplexes the thus-provided image signal and audio signal, and thus, outputs a stream. For example, an MPEG 2 system PS form is used for this multiplexing.

The MPEG 2 encoder 14 has a plurality of coding modes (also called image quality modes or operation modes) for determining the bit rate in coding the image signal according to the compression form such as MPEG. For example, the MPEG 2 encoder 14 has three modes, i.e., a high-definition mode (also called a High Quality mode; HQ mode), a standard mode (also called a Standard Play mode; SP mode), and a low image quality mode (also called a Long Play mode; LP mode). The coding bit rate in the high-definition mode is, for example, 10 Mbps, including a bit rate of 9.744 Mbps on image signal and a bit rate of 256 kbps on audio signal. The bit rate in the standard mode is, for example, 4 Mbps, including a bit rate of 3.744 Mbps on image signal and a bit rate of 256 kbps on audio signal. The bit rate in the low image quality mode is, for example, 2 Mbps, including a bit rate of 1.744 Mbps on image signal and a bit rate of 256 kbps on audio signal.

The de-multiplexer 19 of the MPEG 2 decoder 18 separates an incoming signal into an image signal and an audio signal. The video decoder 20 carries out decoding and decompressing of the image signal coded according to the predetermined compression form. The audio decoder 21 carries out decoding and decompressing of the audio signal on which coding compressing was carried out. The MPEG 2 decoder 18 has a plurality of decoding modes for determining the bit rate in carrying out the decoding and decompressing of the image signal corresponding to the above-mentioned coding modes in the MPEG 2 encoder 14. Thus, there are three modes, i.e., a high-definition mode, a standard mode, and a low image quality mode, as in the MPEG 2 encoder 14.

The controller 25 controls data transfer between the MPEG 2 encoder 14, MPEG 2 decoder 18, CPU 24, SDRAM 26, and the interface part 27, and programs for many gates so as to execute control sequences for the data transfer. Moreover, the controller 25 also has a function of outputting control information (instructions) for the respective parts according to control information (instructions) supplied by a user using a remote controller, etc. This will be described later.

The SDRAM 26 once stores a predetermined coded signal from the MPEG 2 encoder 14, and the coded signal read out from the HDD 28. The thus-stored coded signal is read out from the SDRAM 26, and is output to the HDD 28 or the MPEG 2 decoder 18. The interface part 27 performs interface for the HDD 28 or another external recording apparatus.

The CPU 24 controls the entire image recording apparatus.

The tuner 11 is an option, and, thus, may be excluded from the image recording apparatus.

Figure 2:
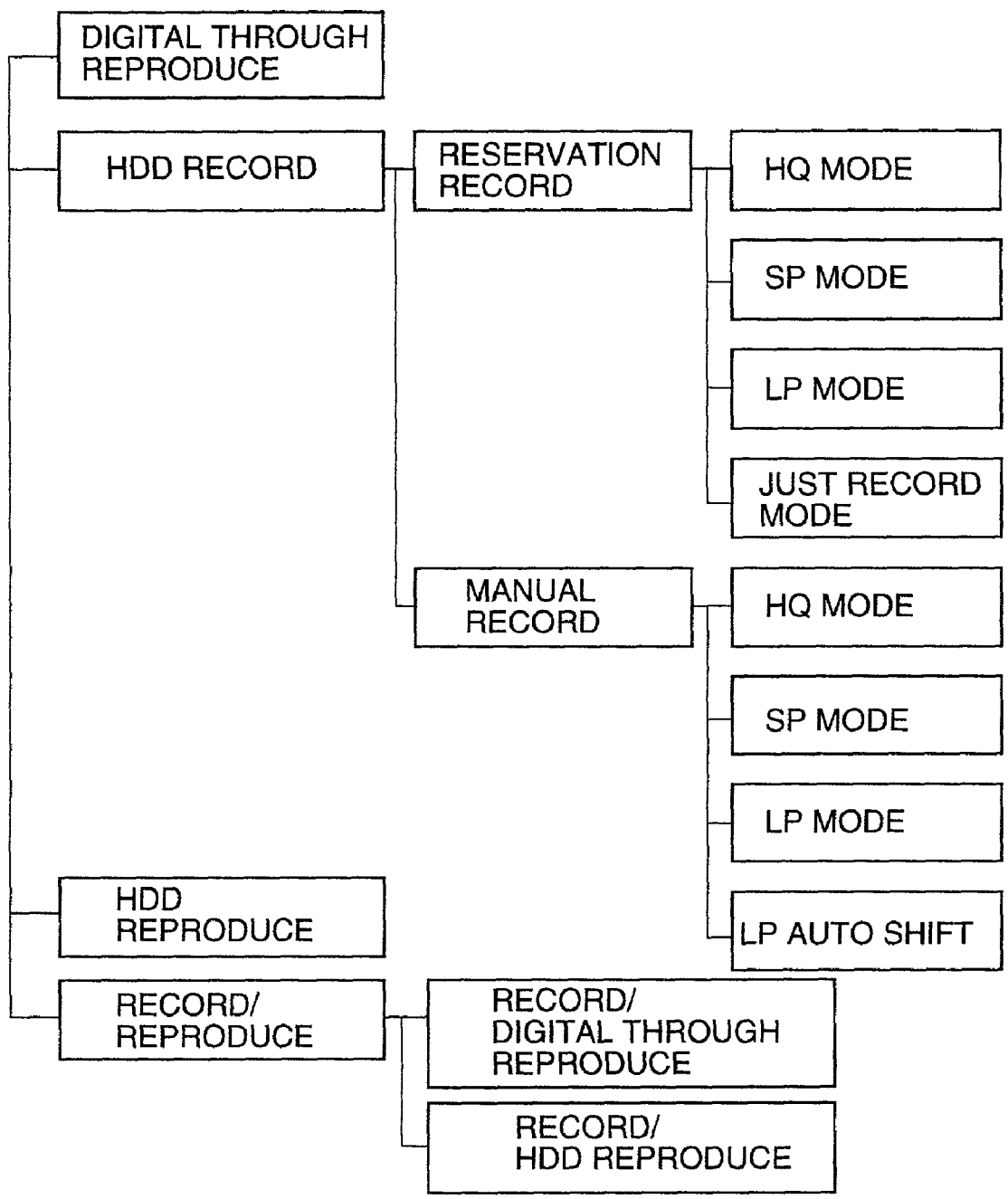
FIG. 2 illustrates functions of the image recording apparatus shown in FIG. 1.

FIG. 2 shows functions of the image recording apparatus shown in FIG. 1. The functions are set as a user inputs a mode from the outside to the controller 25 as will be described later. The image recording apparatus has a HDD recording function, a HDD reproduction function, a recording/reproduction function to perform recording and reproduction simultaneously, and a digital through reproduction function, as shown in the figure. The digital through reproduction function is such that, thereby, image and audio signals pass the following route:

Image signal: input terminal 29 (or tuner 11)→NTSC decoder 12→MPEG 2 encoder 14→controller 25→SDRAM 26→controller 25→MPEG 2 decoder 18→NTSC encoder 22→output terminal 31.

Audio signal: input terminal 30 (or tuner 11)→audio A-D converter 13→MPEG 2 encoder 14→controller 25→SDRAM 26→controller 25→MPEG 2 decoder 18→audio D-A converter 23→output terminal 32.

The bit rate of image signal/data coding and decoding in the digital through reproduction function is determined by either of the following two methods. According to the first method, the bit rate on the mode by which the highest quality of image is obtained. According to the present embodiment, the HQ mode provides the highest quality of image. Accordingly, when the digital through reproduction function is set, the mode of the MPEG 2 encoder 14 and MPEG 2 decoder 18 is automatically set as the HQ mode. When the mode is thus set, the controller 25 outputs the control signal which gives instructions for the HQ mode to the MPEG 2 encoder 14 and MPEG 2 decoder 18 accordingly.

According to the second method, when setting of the bit rate which exceeds that on the HQ mode in the MPEG 2 encoder 14 and MPEG 2 decoder 18 is possible, the highest bit rate is set. For example, in case the HQ mode has the bit rate of 10 Mbps, and the MPEG 2 encoder 14 and MPEG 2 decoder 18 can have further higher bit rate, i.e., 12 Mbps, the bit rate of 12 Mbps is set there. However, any bit rate, other than 12 Mbps, exceeding 10 Mbps may also be set instead.

Since processing is performed through the above-mentioned route by the bit rate set by either of the above-mentioned methods, degradation of the quality of image of the signal which only passes through the image recording apparatus can be controlled to the minimum one. Setting of the above-mentioned bit rate is performed by instructions given by the controller 25.

Thus, features of the image recording apparatus according to the embodiment of the present invention focused on the above function are having a coding/decoding part (14, 18) which operates on a plurality coding/decoding modes of different bit rates; a recording medium (28) coupled with the coding/decoding part; and a control part (25) which, in case an input image signal is output without being stored into the recording medium, sets a predetermined bit rate (for example, the bit rate on the HQ mode) in the coding/decoding part.

The above-mentioned HDD recording function has two functions, i.e., a reservation recording function and a manual recording function. According to the reservation recording function, a just recording mode is prepared in addition to the above-mentioned HQ mode, SP mode and LP mode. According to the manual recording mode, in addition to the above-mentioned three modes, an LP auto (automatic) shift mode is prepared.

The above-mentioned recording/reproduction function has an HDD recording/reproduction function of reproducing image and audio signals from the HDD 28 while recording of the image and audio signals onto the HDD 28 is performed, and a recording/digital through reproduction function. The recording/digital through reproduction function is such that, thereby, the data is passed through according to the above-described digital through reproduction function while recording of the image and audio signals on the HDD 28 is performed. In this case, the coding bit rate for the image signal recorded onto the HDD 28 is one determined by the above-described first or second method.

Figure 3:
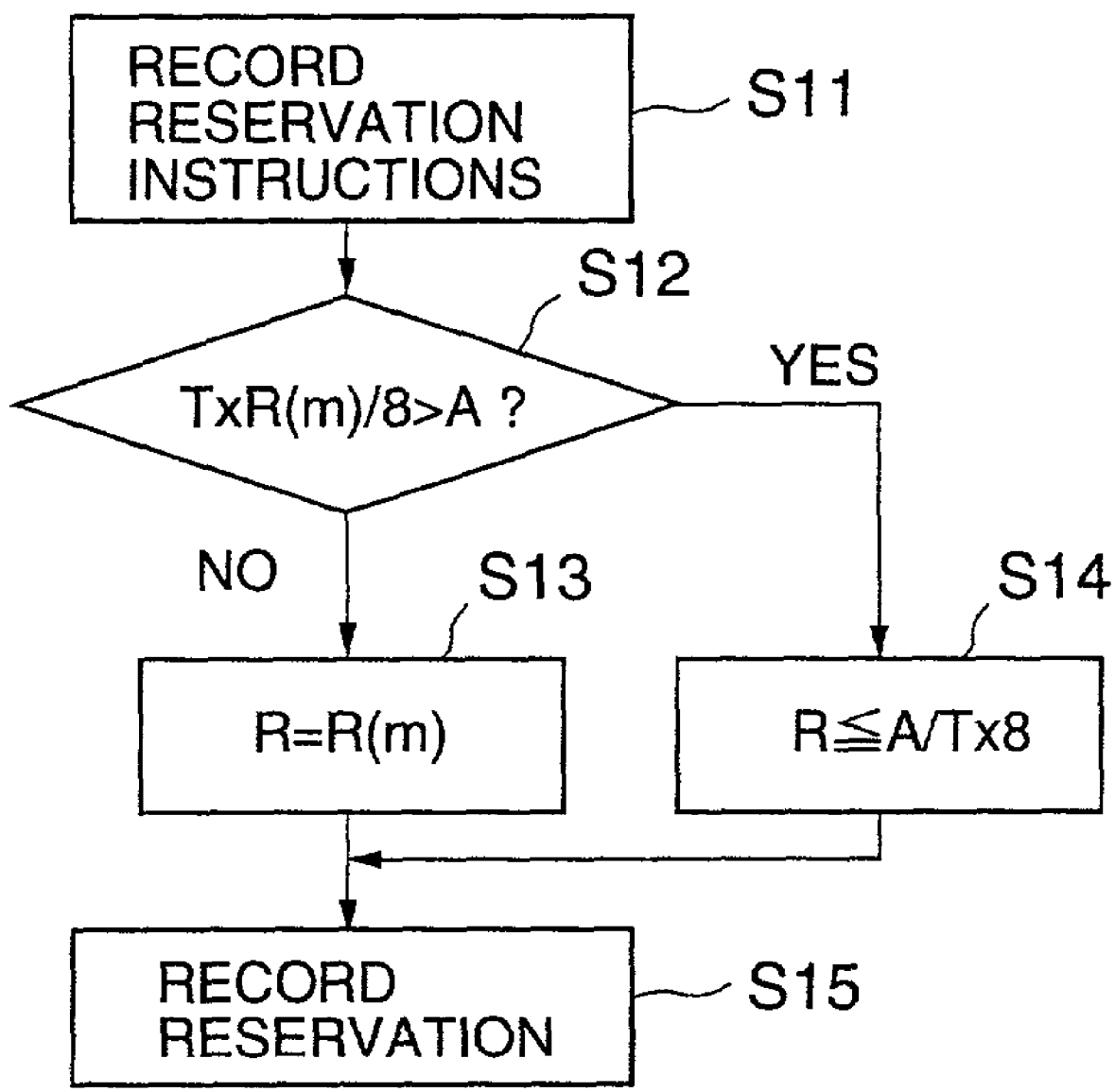
FIG. 3 is a flow chart which shows operation according to a just recording mode shown in FIG. 2.

With reference to FIG. 3, the above-mentioned just recording mode will now be described.

FIG. 3 is a flow chart of operation performed by the CPU 24 on the above-mentioned just recording mode. A user inputs recording reservation instructions and a recording mode to be selected to the controller 25 by using the remote controller, etc. The controller 25 outputs these commands to the CPU 24. The CPU 24 receives the recording reservation command from the controller 25, in a step S11. Then, the CPU 24 makes the following determination:

$$T \times R(m)/8 > A$$

where:

T denotes a recording reserved time (seconds);

A denotes the remaining storage capacity (bytes) of the HDD; and

R(m) denotes the bit rate (bps) on the mode m.

Here, it is assumed that m=1 on the HQ mode; m=2 on the SP mode; and m=3 on the LP mode. The remaining storage capacity means a storage capacity in the HDD 28 remaining and be able to be used for new stream recording.

The CPU 24 makes setting such that R R(m) when the determination result on the step S12 is NO (i.e., when the reserved recording can be completed by the bit rate in the currently set recording mode) in a step S13. That is, the bit rate R applied at the time of actually recording is set to be the bit rate R(m) on the currently set mode. On the other hand, when the determination result on the step S12 is YES (i.e., when the reservation recording cannot be completed by the bit rate on the currently set recording mode), the CPU 24 determines, to be applied to actual recording, the largest bit rate R from among the bit rates which satisfy the following requirement in a step S14:

$$R \leq A/T \times 8$$

However, when the thus-determined R is smaller than the minimum recording bit rate Rmin permitted by the system, it is set that R=Rmin. The above-mentioned largest bit rate R may be the largest one from among the predetermined modes R(m), or may be an arbitrary one from among those within a range permitted by the system. That is, when R exceeds the maximum recording bit rate Rmax permitted by the system, setting is made such that R=Rmax.

Then, the recording reservation including the information on the bit rate determined at the step S13 or S14 is set in a step S15.

Thus, recording by the bit rate according to the remaining storage capacity of the HDD 28 can be performed on the reservation recording efficiently, providing relatively satisfactory image quality.

Figure 4:
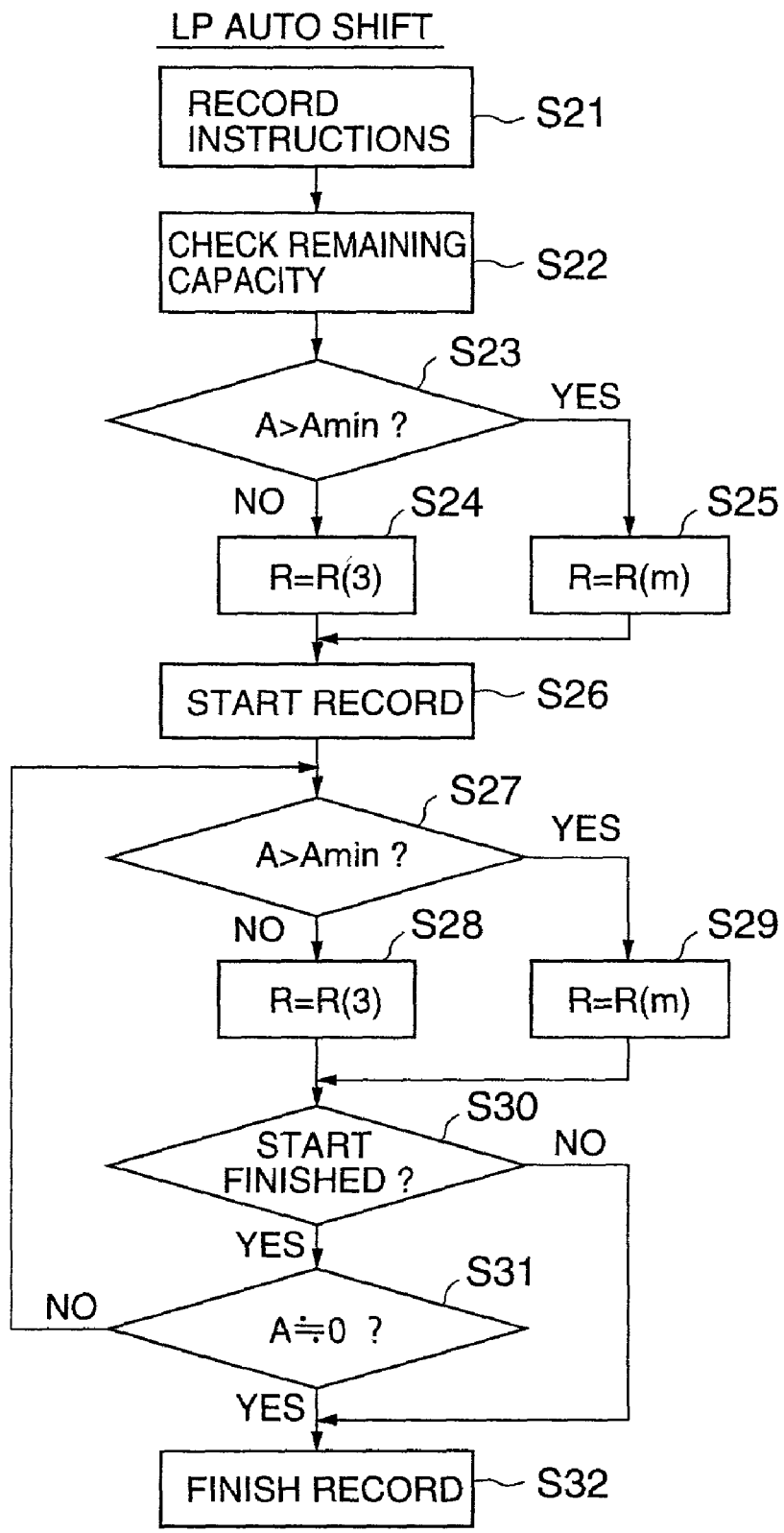
FIG. 4 is a flow chart which shows operation according to an LP auto shift mode shown in FIG. 2.

The above-mentioned LP auto shift function will now be described with reference to FIG. 4. FIG. 4 is a flow chart which shows operation of the CPU 24 performed when the LP auto shift function is set.

The LP auto shift function is one of the manual recording functions, and when the remaining storage capacity on the HDD 28 becomes lower than a predetermined value, the recording mode is automatically shifted to the LP mode.

First, a user inputs recording reservation instructions and a recording mode to be selected to the controller 25 by using the remote controller, etc. The controller 25 outputs these commands to the CPU 24. The CPU 24 receives the recording reservation command from the controller 25, in a step S21. Then, in a step S22, the CPU 24 checks the remaining storage capacity A on the HDD 28. Then, the CPU 24 determines in a step S23, whether the remaining storage capacity A is larger than a threshold Amin. The threshold Amin is used for determining as to whether shift is to be made to the LP mode. When it is not that A=Amin, the CPU 24 makes a setting such that R=R(3) in a step s24. That is, the bit rate at the time of recording is made to be the bit rate on the LP mode, and thus, the LP mode is set. When A>Amin, the CPU 24 makes a setting such that R=R(m) in a step S25. That is, the CPU 24 sets the bit rate on the currently set recording mode R(m). Then, the CPU2 4 makes recording start in a step S26.

After the start of recording, the CPU 24 determines in a step S27 whether or not A>Amin. According to the determination result, the CPU 24 makes a setting such that R=R(3) in a step S28, or makes a setting such that R=R(m) in a step S29. Then, in a step S30, the CPU 24 determines whether or not the recording is finished. When this determination result is NO, in a step S31, the CPU 24 determines whether or not A is almost equal to zero. When this determination result is NO, processing is returned to the step S27. When the determination result on the step S30 is NO, or when the determination result on the step S31 is YES, the CPU 24 terminates the recording in a step S32.

Thus, by repeating the processing on the steps S27 through S31 until the recording is finished or until the remaining storage capacity becomes nearly equal to zero, the operation mode is automatically made into the LP mode in case the remaining storage capacity becomes smaller. Thereby, it is possible to record image and audio signals onto the HDD 28 for a longer time.

The present invention has various features other than the above-described ones, which will become apparent from descriptions of the preferred embodiment which will be described now in more detail.

Figure 5:
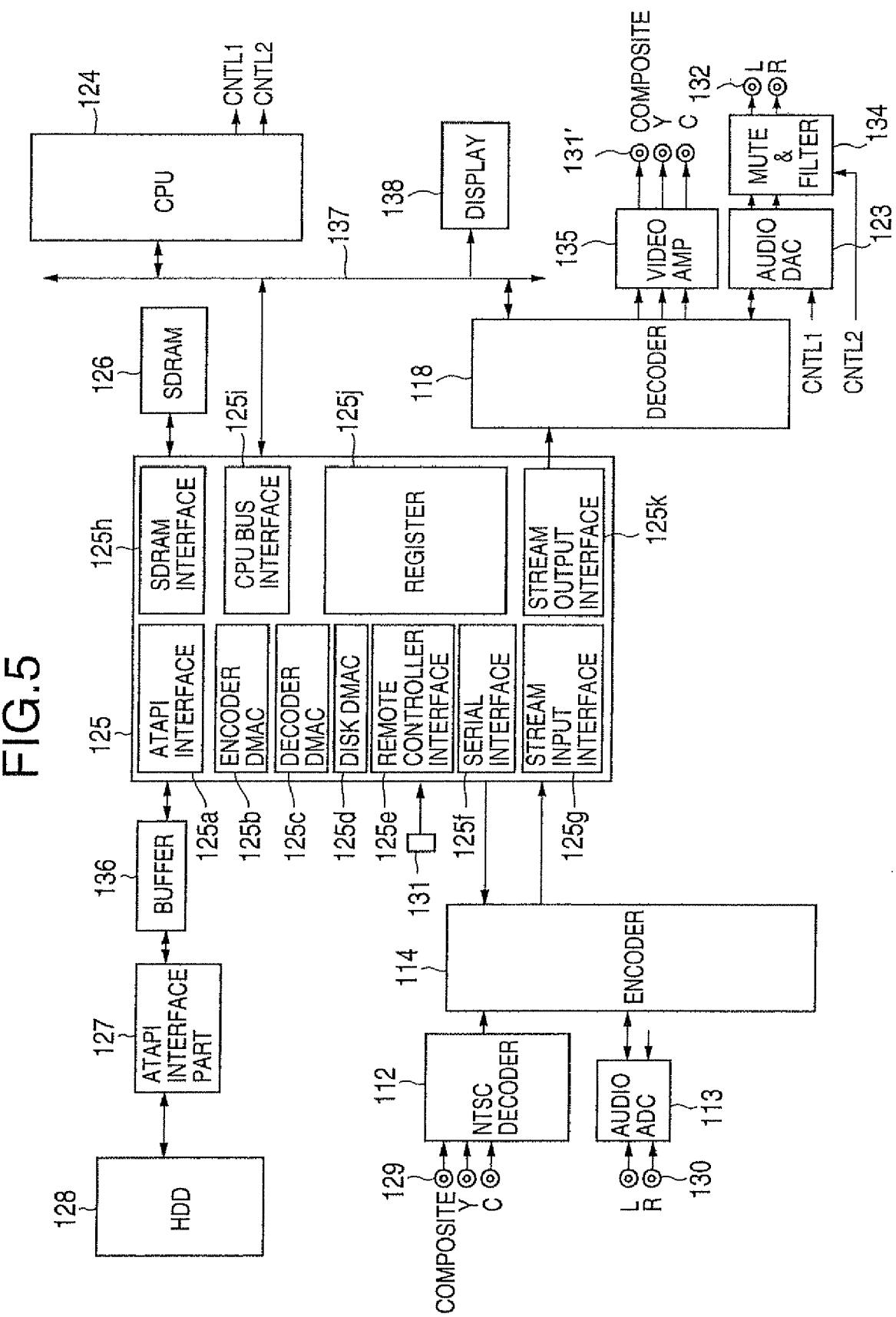
FIG. 5 is a block diagram showing a configuration of the image recording apparatus according to the embodiment of the present invention shown in FIG. 1, in more derail.

FIG. 5 is a block diagram showing the image recording apparatus in the embodiment of the present invention which corresponds to the configuration shown in FIG. 1. The reference numerals obtained through adding 100 to the reference numerals of the components shown in FIG. 1 are given to the corresponding components in FIG. 5.

An NTSC decoder 112 is of SAA7113H provided by Philips, for example. The NTSC decoder 112 converts an NTSC image signal to a YC-multiplexed 8-bit parallel signal. An audio A-D converter 113 is of PCM1800 made by Burr-Brown, for example, and outputs a digital signal according to I²S. An MPEG 2 encoder 114 is of MB86390A of Fujitsu, for example, and compresses an input image signal into MPEG 2 MP@ML, and compresses an input audio signal into MPEG 1 Layer 2 (thus, according to predetermined compression forms). The thus-compressed image signal and audio signal are multiplexed by a multiplexer prepared inside of the MPEG 2 encoder 114, and are output externally as a stream on MPEG 2 system, PS form. An MPEG 2 decoder 118 is of MB86373B by Fujitsu, and has inside thereof the NTSC encoder 22 shown in FIG. 1. An audio D-A converter 123 is of PCM1723 made by Burr-Brown, and converts the digital signal according to I²S into an analog signal. A CPU 124 is of MB91107 by Fujitsu, for example.

Furthermore, the image recording apparatus shown in FIG. 5 has a display unit 138 including a controller 125, an SDRAM 126, an ATAPI interface part 127, a HDD 128, input terminals 129, input terminals 130, a remote controller input part 131, a mute filter part 134, a video amplifier 135, a buffer 136, a CPU bus 137, a liquid crystal device, etc.

The controller 125 has an ATAPI interface part 125a, an encoder DMAC (dynamic memory access controller) 125b, a decoder DMAC 125c, a disk DMAC 125d, a remote controller interface 125e, a serial interface 125f, a stream input interface 125g, an SDRAM interface 125h, a CPU bus interface 125i, a register 125j, and a stream output interface 125k.

The ATAPI interface part 125a acts as an interface for the ATAPI interface part 127 through the buffer 136. The encoder DMAC 125b carries out DMA transfer of a stream (signal on which image signal and audio signal are multiplexed) output from the encoder 114 to the SDRAM 126 through the stream input interface part 125g. Starting up and ending of the DMA transfer are performed by setting a predetermined code into a corresponding area of the register 125j. The decoder DMAC 125c carries out DMA transfer of the stream from the SDRAM 126 to the decoder 118 through the stream output interface 125h. Starting up and ending of the DMA transfer are performed by setting a predetermined code in a corresponding area of the register 125j. The disk DMAC 125d carries out DMA transfer of data stored at an indicated address in the HDD 128 to the SDRAM 126. Starting up and ending of the DMA transfer are performed by setting a predetermined code in a corresponding area of the register 125j. The remote controller interface 125e receives various commands from a remote controller, not shown in the figure, and sets predetermined codes in a corresponding area of the register 125j accordingly.

The serial interface 125f acts as an interface for outputting control signals, such as a mode setting signal, to the encoder 114. The SDRAM interface 125h acts as an interface for the SDRAM 126. The CPU bus interface 125i acts as an interface for the CPU bus 137.

The CPU 124 controls each part/component through the CPU bus 124. For example, the CPU 124 checks a flag of the register 125j of the controller 125, and performs corresponding processing. Moreover, the CPU 124 outputs control signals CNTL1 and CNTL2 to the audio D-A converter 123 or filter 134, and thus, controls the audio signal processed thereby.

The input terminals 129 include a composite terminal CT, a Y terminal, and a C terminal. The input terminals 130 include an L (left) terminal and an R (right) terminal. The output terminals 131' include a composite terminal, a Y terminal, and a C terminal. The output terminals 132 include an L (left) terminal and an R (right) terminal.

Figure 6:
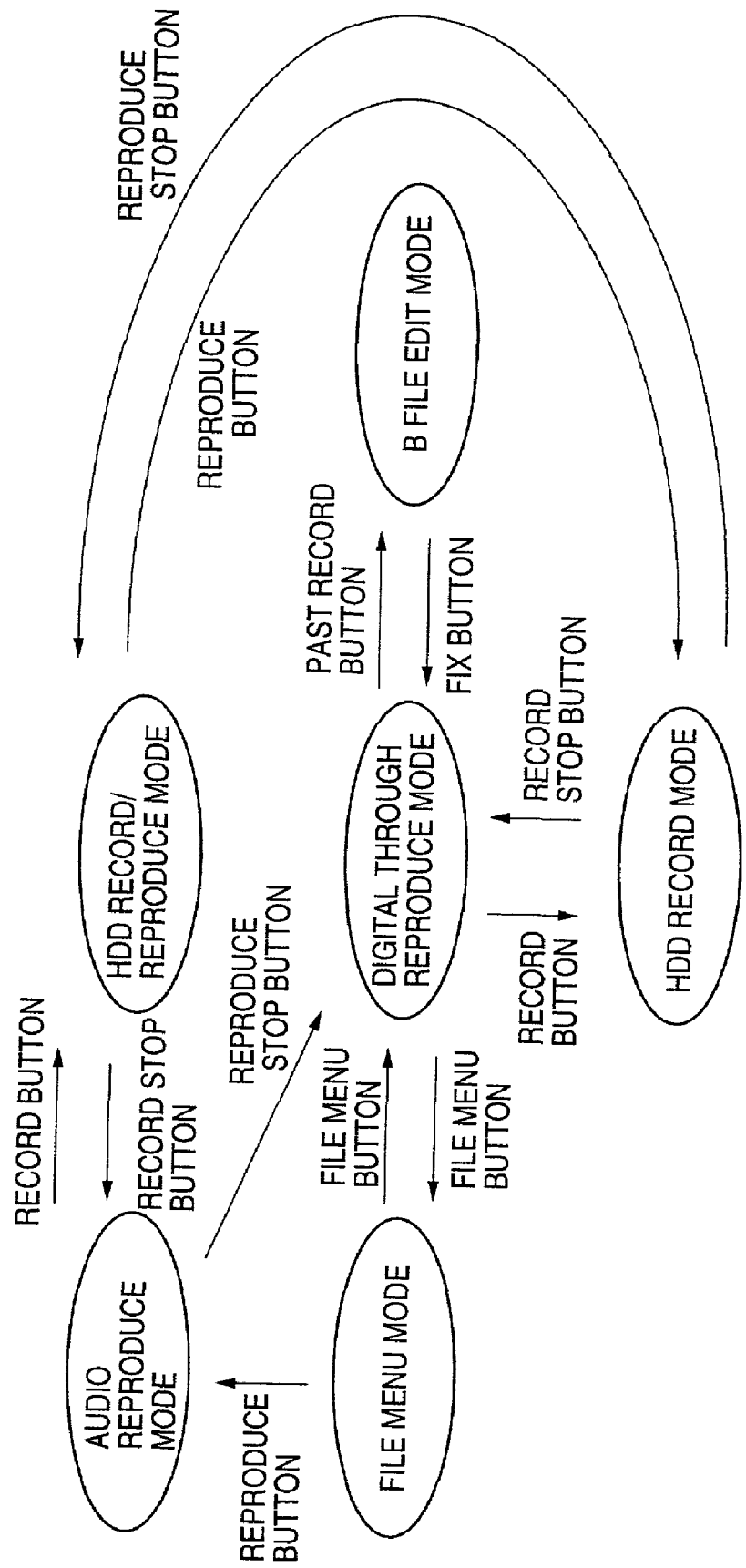
FIG. 6 illustrates a relationship between respective operation modes of the image recording apparatus shown in FIG. 5 and operation buttons on a remote controller.

FIG. 6 is a state transition diagram on the image recording apparatus shown in FIG. 5. In addition to the above-described HDD recording mode, HDD reproduction mode, recording/reproduction mode, and digital through reproduction mode, the image recording apparatus has a file menu mode and a B file edit mode. These modes can be designated by operating buttons prepared on the remote controller, not shown in the figure. The buttons prepared on the remote controller are shown in FIG. 6. For example, when a "file menu button" is operated on a menu mode, the digital through reproduction mode is selected. When a "recording button" is operated on this mode, the mode of image recording apparatus is shifted to the HDD recording mode.

Figure 7:
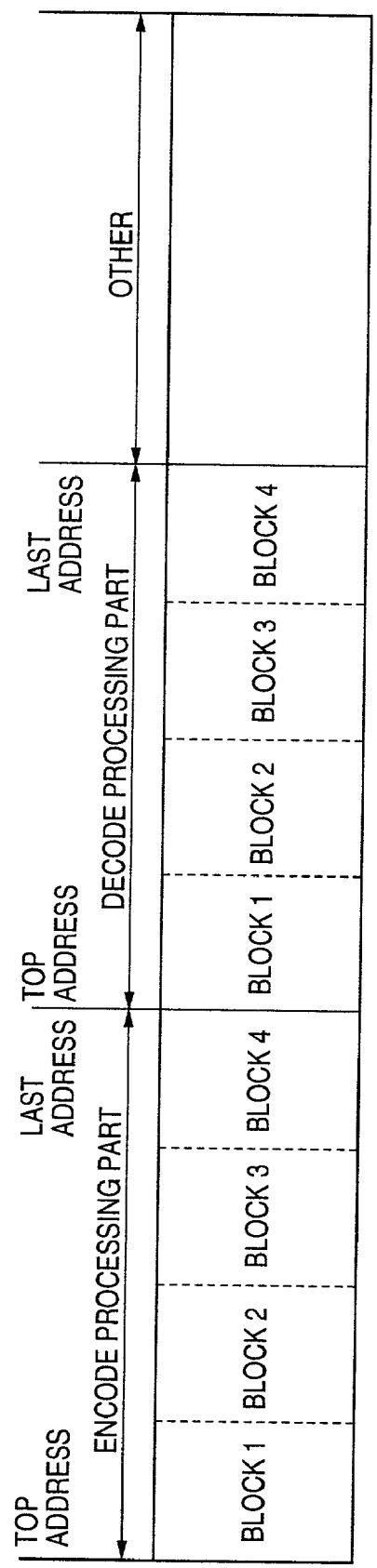
FIG. 7 shows data allocation in a work area on an SDRAM shown in FIG. 5.

FIG. 7 shows allocation on a work area of the SDRAM 126. A memory area of the SDRAM 126 is divided into areas of an encoding processing part, a decoding processing part, and others. Each of these processing parts serve as ring buffers. For example, writing is started from a top address and, after the writing is finished to the last address continuously, writing is re-started from the top address, in case a stream is written to the encoding processing part. Each of the encoding processing part and decoding processing part are divided into 4 blocks, respectively. For example, the encoder DMAC 125b is started, and coding processing is started, as shown in a flow chart described later, in performing the HDD recording continuously. After the start of coding, a stream is written under control of the encoder DMAC 125b from the top address of the encoding processing part of SDRAM 126. When writing to the block 1 is finished, the stream written into the block 1 of the SDRAM 126 by the disk DMAC 125d is transferred to the HDD 128. During the transfer to the HDD 128, the encoder DMAC 125b transfers a stream to the block 2.

The decoding processing part of the SDRAM 126 is used as follows: At a start of decoding, data is written into the HDD 128 under the control of the disk DMAC 125d from the top address of the decoding processing part of the SDRAM 126. When writing into the block 1 is finished, DMA transfer of the data written in the block 1 of the SDRAM 126 is carried out to the decoder 118 by the decoder DMAC 125c. During the DMA transfer to the decoder 118, the disk DMAC 125d continuously writes data to the block 2 of the SDRAM 126.

Operation of the HDD recording will now be described with reference to FIG. 8 in detail.

The HDD recording is started as a user inputs the HDD recording mode (see FIG. 6) using the remote controller. The remote controller interface 125e of the controller 125 which receives this input writes a code corresponding to the HDD recording mode into a predetermined area of the register 125j. The CPU 124 accesses the register 125j periodically, and detects that the HDD recording mode is thus set. Then, the CPU 124 writes a code corresponding to coding start at a predetermined area of the register 125j. The encoder DMAC 125b monitors the contents of the register 125j periodically. The encoder DMAC 125b starts operation, when it detects that the code for coding start is set (in a step S41).

Then, the encoder DMAC 125b outputs a control code corresponding to coding start to the encoder 114 through the serial interface 125f (in a step S41). The encoder 114 which receives this control code starts coding and compressing of an image signal given via the composite input terminal or Y terminal and C terminal, and then decoded by the NTSC decoder 112, and an audio signal given via the L terminal and R terminal and then converted into a digital signal by the audio A-D converter 113 (in a step S42).

The stream which the encoder 114 outputs is written into the encoding processing part (see FIG. 7) of the SDRAM 126 through the stream input interface 125g of the controller 125. The encoder DMAC 125b determines constantly whether the writing for one block has been completed (in a step S43). When the determination result of the step S43 is YES, the CPU 124 receives corresponding information from the encoder DMAC 125b, and writes a code corresponding to start of DMA transfer to the HDD 128 in a predetermined area of the register 125j.

The disk DMAC 125*d* checks the register 125*j* periodically, and starts operation when detecting that the code corresponding to start of DMA transfer is set (in a step S44). Then, the disk DMAC 125*d* transfers one block of stream, writing of which has been completed, to the HDD 128 through the ATAPI interface 125*a*.

The CPU 125 determines whether instructions of HDD recording stop is given (in a step S45). The instructions of HDD recording stop may be given by a user through the remote controller or a setting time on a timer is expired. The timer may be provided in a program which the CPU 124 performs. When the determination result on the step S45 is YES, the CPU 124 writes a code corresponding to coding stop in a predetermined area of the register 125*j* (in a step S46). The encoder 114 receives a corresponding control code from the controller 125, and terminates the coding and compressing processing. Moreover, the CPU 124 writes a code corresponding to DMA transfer stop of stream from the encoder 114 in a predetermined area of the register 125*j* (in a step S47). The encoder DMAC 125*b* detects this code and stops the DMA transfer. Furthermore, the CPU 124 writes a code corresponding to stop of DMA transfer to the HDD 128 in a predetermined area of the register 125*j* (in a step S48). The disk DMAC 125*d* detects this code and stops the DMA transfer.

On the other hand, when the determination result on the step S45 is NO, the CPU 124 determines as to whether there is a block, writing on which has been completed. When there is a block, writing on which has been completed, the processing is returned to the step S45. When there is no block, writing on which has been completed, a step S50 is performed. In the step S50, the CPU 124 stops the DMA transfer to the HDD 128 as in the step S48. Then, the CPU 124 checks existence of a block, writing on which has been completed, again (in a step S51). When there is a written block, the step S44 is returned to.

Figure 8:
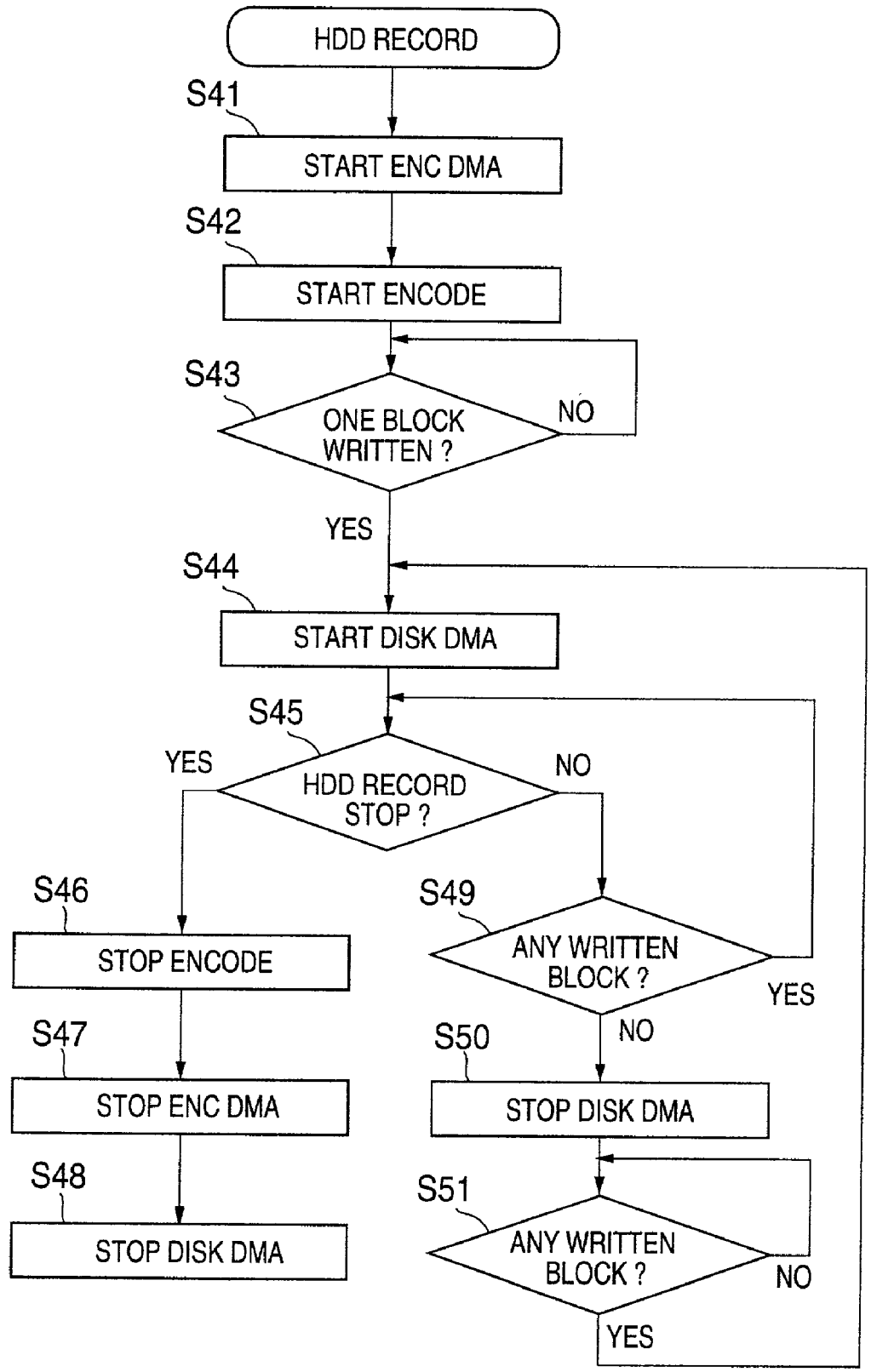
FIG. 8 is a flow chart which shows an HDD recording operation of the image recording apparatus shown in FIG. 5.

In HDD recording processing shown in FIG. 8, processing of FIG. 3 and FIG. 4 which have been described above is performed. For example, setting for the just recording mode shown in FIG. 3 is performed before starting of the HDD recording of FIG. 8. Moreover, in setting of the LP auto shift mode shown in FIG. 4, the step S26 corresponds to the beginning of the flow chart of FIG. 8.

Figure 9:
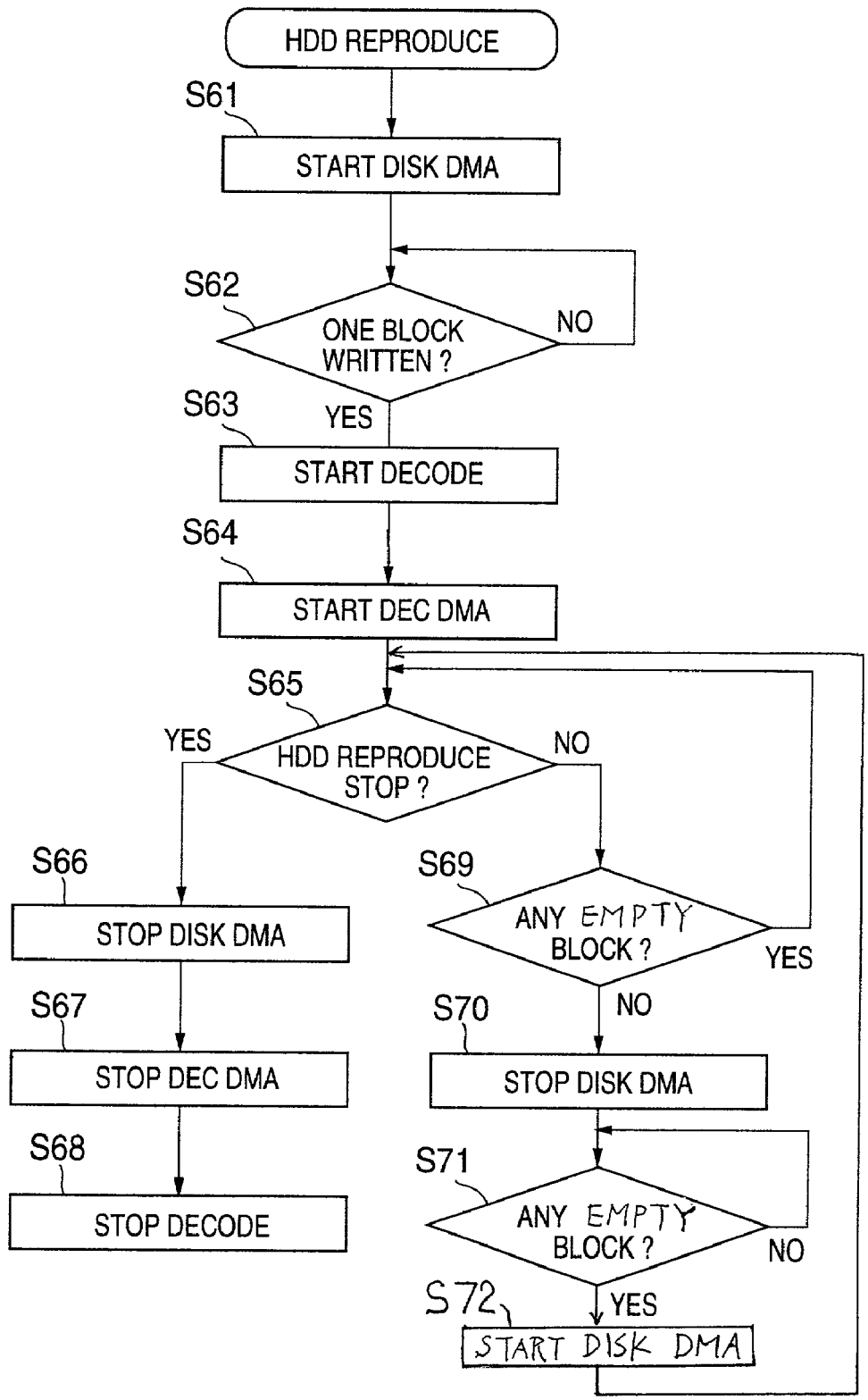
FIG. 9 is a flow chart which shows an HDD reproduction operation of the image recording apparatus shown in FIG. 5.

Operation of reproducing data from the HDD 128 will now be described with reference to FIG. 9.

The HDD reproduction is started as a user inputs selection of the HDD reproduction mode (see FIG. 6) using the remote controller. The remote controller interface 125*e* of the controller 125 which receives this input writes a code corresponding to the HDD reproduction mode in a predetermined area of the register 125*j*. The CPU 124 accesses the register 125*j* periodically, and it detects that the HDD reproduction mode is thus set. Then, the CPU 124 writes a code corresponding to HDD reproduction in a predetermined area of the register 125*j*. The disk DMAC 125*d* checks the contents of the register 125*j* periodically. The disk DMAC 125*d* starts operation, when it detects that the code of the HDD reproduction is set (in a step S61). The disk DMAC 125*d* then reads a corresponding stream from the HDD 128, and writes it in the decoding processing part (see FIG. 7) of the SDRAM 126 via the SDRAM interface 125*h*.

The disk DMAC 125*d* constantly checks whether the writing of one block of stream has been completed (in a step S62). When the determination result of the step S62 is YES, the CPU 124 receives this notice and writes a code which makes operation of the decoder 118 start in a predetermined area of the register 125*j* (in a step S63). The decoder DMAC 125*c* checks the register 125*j* periodically, and starts operation when detecting the code which makes operation of the decoder 118 start (in a step S64). One block of stream is read from the SDRAM 126, passes through the SDRAM interface 125*h* and stream output interface 125*h*, and is supplied to the decoder 118.

The CPU 124 determines whether instructions of stopping the HDD reproduction are given (in a step S65). When the determination result of the step S65 is YES, the CPU 124 performs, steps S66 and S67 same as the steps S46 and S47 (see FIG. 8). Then, in a step S68, a code corresponding to stop of operation on the decoder 118 is written in a predetermined area of the register 125*j* by the CPU 124. The decoder 135 which checks it stops the operation. When the determination result of the step S65 is NO, steps S69, S70, S71 and S72 are performed same as the steps S49, S50, S51 and S44 (see FIG. 8).

Figure 10:
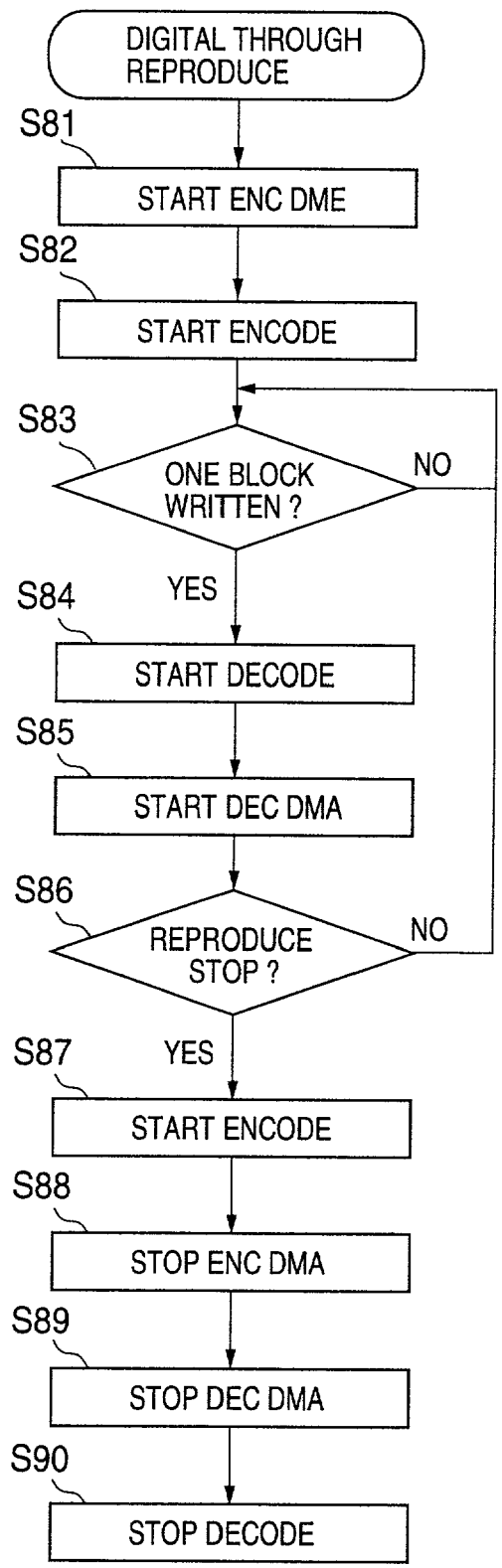
FIG. 10 shows a flow chart which shows a digital through reproduction operation of the image recording apparatus shown in FIG. 5.

FIG. 10 is a flow chart which shows operation of the digital through reproduction.

When a user gives instructions for the digital through reproduction using the remote controller, a corresponding code is written to a predetermined area of the register 125*j*. The CPU 124 detects this code and starts up the encoder DMAC 125*b* as in the step S41 (see FIG. 8), in a step S81. Then, steps S82 and S83 same as the steps S42 and S43 mentioned above are performed.

Coding and compressing processing performed in the step S82, as described above, is performed after setting of a bit rate according either to the first method in which the bit rate on the mode, among the plurality of modes, by which the highest image quality is obtained is set, or to the second method in which, in case setting of a bit rate higher than that on the HQ mode can be made on the encoder 114 and MPEG 2 decoder 118, the available highest bit rate is set.

According to the digital through reproduction, input data is output without being written into the HDD 128. Therefore, when it is determined that writing of one block has been completed in the step S83, in order to carry out decoding and decompression of the data which has been coded and compressed, processing by the decoder 118 is started in a step S84. Processing in the step S84 is same as that of the step S63 (see FIG. 9) mentioned above. Then, the decoder DMAC 125*c* starts operation as in the step S64 mentioned above (in a step S85).

The CPU 124 determines whether instructions of stopping of the reproduction is given (in a step S86). The instructions of stopping of the reproduction may be given by a user, for example. When the determination result of the step S86 is NO, the step S83 is returned to. On the other hand, when the determination result of the step S86 is YES, the encoder 114 stops the coding and compressing processing as in the step S46 mentioned above (in a step S87). Moreover, the encoder DMAC 125*b* stops operation as in the step S47 mentioned above (in a step S88). Furthermore, the decoder DMAC 125*c* stops operation as in the step S67 mentioned above (in a step S89). At the end, the decoder 118 stops operation as in the step S68 mentioned above (in a step S90).

Figure 11:
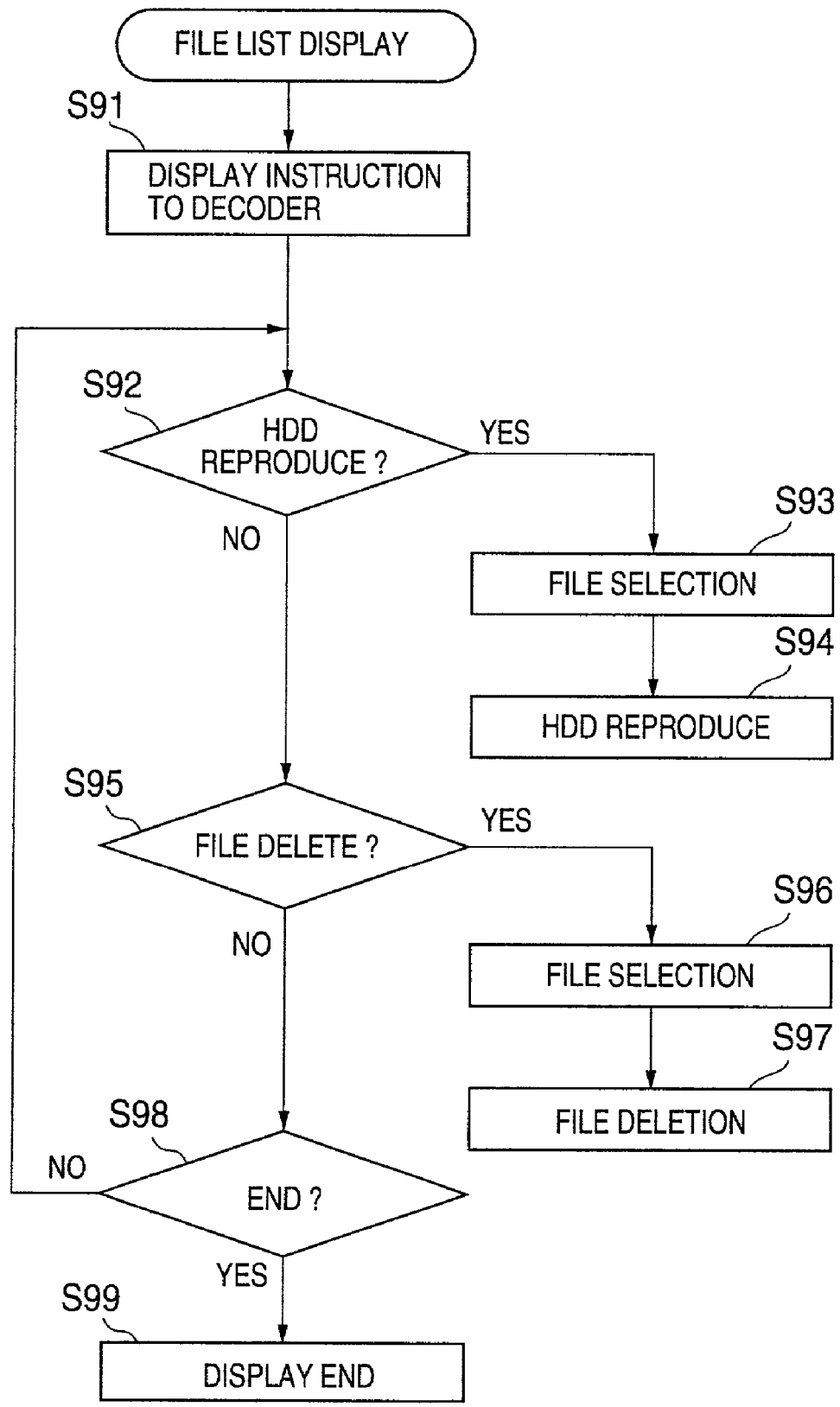
FIG. 11 shows a flow chart which shows a file list display operation of the image recording apparatus shown in FIG. 5.

Operation of the file list display will now be described with reference to FIG. 11. When recording a stream into the HDD 128, the stream is treated as a file.

Figure 12A:
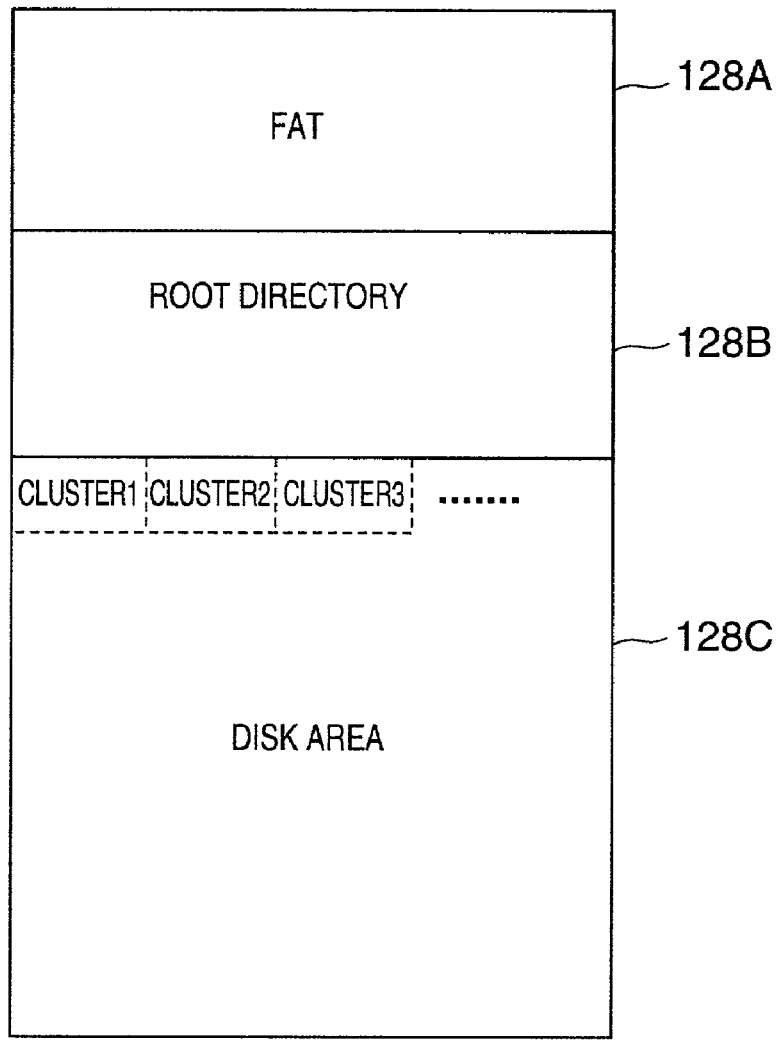
FIGS. 12A and 12B illustrate a recording area of an HDD of the image recording apparatus shown in FIG. 5.
Figure 12B:
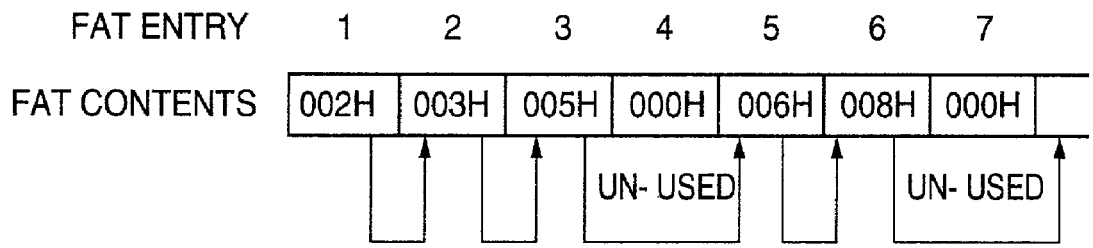

FIGS. 12A and 12B illustrate an example (FIG. 12A) of a recording area of the HDD 128 and an example (FIG. 12B) of a stream recorded. As shown in FIG. 12A, the recording area of the HDD128 has a FAT (File Allocation Table) area 128A, a root directory area 128B, and a disk area 128C. The FAT area 128A stores information (cluster numbers) which shows connection relationship of clusters which constitutes a file for every file according to numbers (continuation numbers given to the clusters) of FAT entry. For example, as shown in FIG. 12B, a cluster number, such as 002H, is designated for each number of FAT entry. The cluster number given shows the number of a cluster connected subsequently. Therefore, the file of FIG. 12B includes clusters of 002H, 003H, 005H, 006H, and 008H. That is, this file includes clusters recorded discontinuously, as cluster 1, cluster 2, cluster 3, cluster 5, cluster 6, cluster 8, . . . , in the disk area 128C. There, 000H means un-used one.

Information recorded in the root directory area 128B is a part of information concerning files, and the remaining information (the others) concerning the files is recorded in a head or a tail end of each file stored in the disk area 128C. That is, according to the present embodiment, information (file information) concerning files is divided and recorded into the root directory area 128B and disk area 128C separately. In contrast thereto, according to the related art, all the file information is stored in the root directory area 128B.

The file information recorded in the root directory area 128B includes file names, extensions, file sizes, first FAT entries, file creation dates or latest updated dates, and information concerning file attributes. Moreover, the file information recorded in the head or the tail end of each file in the disk area 128C is information concerning, for example, stream forms (MPEG 2 PS/MPEG 2 TS/MPEG 1 System), bit rates, coding and compressing (encoding) modes (variable-length bit rates or fixed-length bit rates), video modes (NTSC, PAL, etc.), resolutions (HQ and SP, LP modes, etc., described above), and audio sampling frequencies. This information is needed for decoding and decompressing processing by the decoder 118. That is, this information is added to the stream read out at the above-mentioned step S61.

Thus, the file information recorded in the root directory area 128B is general information also usable by other various file systems. Therefore, the information recorded in the root directory area 128B can also be used as it is, even when a different file system (for example, an HDD on a different type) is applied.

Returning to FIG. 11, according to the file list display, on the display device 138, files stored in the disk area 128C of FIG. 12A are displayed, and then, the HDD reproduction, file deletion, etc may be performed thereon. Through the ATAPI interface 125a of the controller 125, the CPU 124 reads the file information from the HDD 128, and stores it in a register in the decoder 118 (in a step S91). The CPU 124 displays information, such as the file names, recording beginning dates/times, recording lengths, recording modes, etc., on the display device 138 using the file information stored in this register. An example of this display is shown in FIG. 13A. When a user views this display contents and inputs a file to be reproduced (in a step S92), the CPU 124 which receives the input of the file through the controller 125 sends information on the thus-selected file to the disk DMAC 125d (in a step S93), and performs HDD reproduction accordingly (in a step S94). The HDD reproduction in the step S94 is performed according to the procedure shown in FIG. 9.

When the determination result of the step S92 is NO, the CPU 124 determines whether instructions of file deletion is given (in a step S95). Such instructions may be input by a user using the remote controller. When the determination result in the step S95 is YES, the CPU 124 sends information on the selected file to the HDD 128 through the controller 125, buffer 136, and interface part 127 (in a step S97), and performs the file deletion (in a step S97).

The CPU 124 determines whether instructions for end of file list processing is given through the remote controller by the user (in a step S98). When this determination result is NO, the step S92 is returned to. When it is YES, the CPU 124 ends the display processing (in a step S99).

With reference to FIGS. 13A through 15, the above-mentioned B file edit processing will now be described.

Two file states A and B are used according to the present embodiment. The file state A is such that states of files are those in which a user can recognize on the recording file list shown in FIG. 13A. That is, flies in the file state A are ordinary files. Files in the file state B are those which are not displayed on the above-mentioned recording file list. That is, files in the file state B are hidden, and, thus, cannot be accessed by a user. Therefore, these files cannot be read out.

According to the present embodiment, regardless of user's intention, when any empty space/area (remaining storage capacity) exists in the HDD 128, a given steam is automatically recorded in the above-mentioned state B, and, then, when the stream is needed by a user, that is, for example, when the user finds out that a TV program should be recorded, after the broadcast of the TV program has been finished, all or a part of the file thus recorded in the file state B is changed into the file state A so that the user can read it.

For example, as shown in FIG. 14A, in case files 1, 2 and 3 in the file state A are stored in the HDD 128, as shown in FIG. 14A, processing of recording a file 4 in an empty area of the HDD 128 in the file state B is started from immediately after completion of recording of the file 3 (12:00 on Mar. 9, 2000). This file 4 is a file of an image signal and an audio signal subsequently supplied to the input terminals 129 and 130. The recording of this file 4 is ended at 20:00 on Mar. 9, 2000, as shown in the figure.

A user who has forgotten to record a program to be saved in a videotape operates the remote controller, and gives instructions to display a display image concerning the B file edit shown in FIG. 13B (in a step S101 of FIG. 15). On the display image of FIG. 13B, displayed are a storage possible time zone (12:00 on Mar. 9, 2000 through 20:00 on Mar. 9, 2000) for the file 4, shown in FIG. 14A, and two windows 151 and 152 by which a user can specify a file portion which the user actually needs to record. The window 151 is used in order to specify date/time the recording starts, and the window 152 is used in order to specify date/time the recording ends.

An example of FIG. 13B shows a state where the user has already input dates/times into the windows 151 and 152. The user specifies the date/time recording starts, and date/time recording ends using the remote controller (in steps S102 and S103). Then, when the user operates the remote controller so as to send instructions of storing information as a file via the remote controller interface 125e, the data on the portion specified in the steps S102 and S103 is saved in the file state A in the HDD 128 (in a step S104).

Thereby, as shown in FIG. 14B, the file 4 becomes a file in the file state A. Therefore, as the user requests a file list display, the display contents thus becomes those as shown in FIG. 13C. The file 4 which was not displayed in FIG. 13A is then displayed in FIG. 13C.

In addition, information concerning the file states A and B is written as a part of file information recorded, for example, in the above-mentioned root directory 128B.

Thus, when a vacant area (remaining storage capacity) exists in the HDD 128, recording is made thereto as a file in the file state B, regardless of user's intention. When no vacant area remains, the recording may be terminated, or, recording is started from the top (oldest one) of the file sequentially in an overwriting manner.

The present embodiment described above may be embodied as a semiconductor device in a form of a single chip of a system LSI circuit at least including electronic circuits acting as the control part (CPU 24; 124) and coding/decoding part (15, 16, 20, 21; 114, 118) shown in FIGS. 1 and 5.

Further, the present invention is not limited to the above-described embodiment, and variations and modifications may be made without departing from the scope of the present invention.

For example, the HDD may be replaced by another recording medium, such as a DVD, or the like. Moreover, any television signal other than the NTSC type one (for example, PAL type one, etc.) may also be applied.

The present application is based on Japanese priority application No. 2001-097136, filed on Mar. 29, 2001, the entire contents of which are hereby incorporated by reference.

What is claimed is:

1. An image recording apparatus, comprising:
a coding/decoding part performing coding and decoding a given signal in one of a plurality of coding/decoding modes of different bit rates;
a recording medium coupled with said coding/decoding part; and
a control part setting a predetermined bit rate to be applied by said coding/decoding part in case the given signal is output after being coded and decoded by said coding/decoding part without storage thereof in said recording medium, wherein
the image recording apparatus functions in at least two modes, a first mode in which the given signal is recorded/reproduced on the recording medium, and a second mode in which the given signal is not recorded/reproduced on the recording medium but is output, and
switching between the first mode and the second mode is determined by a remote controller,
wherein the predetermined bit rate is equal to or larger than a bit rate determined by the control part based on a remaining capacity of the recording medium in the first mode.

2. The image recording apparatus as claimed in claim 1, wherein the predetermined bit rate is that on such a mode of the plurality of coding/decoding modes as to provide the highest image quality.

3. The image recording apparatus as claimed in claim 1, wherein the predetermined bit rate is further higher than that on such a mode of the plurality of coding/decoding modes as to provide the highest image quality.

4. An image recording apparatus, comprising:
a coding/decoding part performing coding and decoding a given signal in one of a plurality of coding/decoding modes of different bit rates;
a recording medium coupled with said coding/decoding part; and
a control part causing an input image signal to be automatically recorded into said recording medium even if no instructions for recording the input image signal is given, and causing the image signal thus recorded into the recording medium to be accessible when predetermined instructions concerning the image signal is given, wherein
the image recording apparatus functions in at least two modes, a first mode in which the given signal is recorded/reproduced on the recording medium, and a second mode in which the given signal is not recorded/reproduced on the recording medium but is output, and
switching between the first mode and the second mode is determined by a remote controller, wherein a bit rate of the second mode is equal to or larger than a bit rate determined by the control part based on a remaining capacity of the recording medium in the first mode.

5. The image recording apparatus as claimed in claim 4, wherein said control part does not perform the automatic recording of the image signal when the remaining storage capacity of the recording medium is less than a predetermined value.

6. The image recording apparatus as claimed in claim 4, wherein said control part causes the image signal to be automatically recorded into a file, which a user cannot access, of the recording medium.

7. The image recording apparatus as claimed in claim 4, wherein control information concerning the image signal is divided and recorded into the recording medium in a directory area thereof and also an area thereof in which the image signal is stored separately.

8. A semiconductor device, comprising:
a coding/decoding circuit performing coding and decoding a given signal in one of a plurality of coding/decoding modes of different bit rates; and
a control circuit setting a predetermined bit rate to be applied by said coding/decoding circuit in case the given signal is output after being coded and decoded by said coding/decoding part without storage thereof in a predetermined recording medium, wherein
the semiconductor device functions in at least two modes, a first mode in which the given signal is recorded/reproduced on the recording medium, and a second mode in which the given signal is not recorded/reproduced on the recording medium but is output, and
switching between the first mode and the second mode is determined by a remote controller, wherein a bit rate of the second mode is equal to or larger than a bit rate determined by the control circuit based on a remaining capacity of the recording medium in the first mode.

9. The semiconductor device as claimed in claim 8, wherein the predetermined bit rate is that of such a mode of the plurality of coding/decoding modes as to provide the highest image quality.

10. The semiconductor device as claimed in claim 8, wherein the predetermined bit rate is further higher than that of such a mode of the plurality of coding/decoding modes as to provide the highest image quality.

11. A semiconductor device, comprising:
a coding/decoding circuit performing coding and decoding a given signal in one of a plurality of coding/decoding modes of different bit rates; and
a control circuit automatically setting a bit rate corresponding to one of the plurality of coding/decoding modes to be applied by said coding/decoding circuit according to at least a remaining storage capacity A (bytes) of a recording medium in which the given signal is recorded, wherein:
the control circuit sets the bit rate further depending on a time T (seconds) of recording reserved, a maximum available recording bit rate Rmax (bps), and a minimum available recording bit rate Rmin (bps), and
said control circuit determines the bit rate R (bps) by which the recording is performed to satisfy the following formula:

$$T \times R/8 \leq A$$

wherein, R=Rmax when R>Rmax; and
R=Rmin when R<Rmin.

12. An image recording apparatus, comprising:
the semiconductor device of claim 11; and the recording medium coupled with said coding/decoding part of the semiconductor device.

13. A semiconductor device, comprising:
a coding/decoding circuit performing coding and decoding a given signal in one of a plurality of coding/decoding modes of different bit rates, the plurality of coding/decoding modes including a first mode in which the given signal is recorded/reproduced on a recording medium, and a second mode in which the given signal is not recorded/reproduced on the recording medium but is output; and
a control circuit automatically setting a first bit rate corresponding to the first mode according to a remaining storage capacity A (bytes) of the recording medium, wherein said control circuit lowers the first bit rate when the remaining storage capacity A is less than a predetermined value, and a second bit rate of the second mode is equal to or larger than the first bit rate.

14. An image recording apparatus, comprising:
a semiconductor device as recited in claim 13; and
the recording medium coupled with said coding/decoding part of the semiconductor device.

15. A semiconductor device, comprising:
a coding/decoding circuit performing coding and decoding a given signal in one of a plurality of coding/decoding modes of different bit rates; and
a control circuit automatically setting a bit rate corresponding to one of the plurality of coding/decoding modes to be applied by said coding/decoding circuit according to at least a remaining storage capacity A (bytes) of a recording medium in which the given signal is recorded, wherein:
the control circuit sets the bit rate further depending on a time T (seconds) of recording reserved, and a minimum available recording bit rate Rmin (bps), and
said control circuit determines the bit rate R (bps) by which the recording is performed to satisfy the following formula:

$T \times R/8 \leq A$ wherein R=Rmin when R<Rmin.

16. An image recording apparatus, comprising:
a semiconductor device as recited in claim 15; and
a recording medium coupled with said coding/decoding part of the semiconductor device.

17. A semiconductor device, comprising:
a coding/decoding circuit performing coding and decoding a given signal in one of a plurality of coding/decoding modes of different bit rates; and
a control circuit causing an input image signal to be automatically recorded into a predetermined recording medium even if no instructions for recording the input image signal is given, and, causing the image signal thus recorded into the recording medium to be accessible when predetermined instructions concerning the image signal is given, wherein
the semiconductor device functions in at least two modes, a first mode in which the given signal is recorded/reproduced on the recording medium, and a second mode in which the given signal is not recorded/reproduced on the recording medium but is output, and
switching between the first mode and the second mode is determined by a remote controller, wherein a bit rate of the second mode is equal to or larger than a bit rate determined by the control circuit based on a remaining capacity of the recording medium in the first mode.

18. The semiconductor device as claimed in claim 17, wherein said control circuit does not perform the automatic recording of the image signal when the remaining storage capacity of the recording medium is less than a predetermined value.

19. The semiconductor device as claimed in claim 17, wherein said control circuit causes the image signal to be automatically recorded into a file, which a user cannot access, of the recording medium.

20. The semiconductor device as claimed in claim 17, wherein control information concerning the image signal is divided and recorded into the recording medium in a directory area thereof and an area thereof in which the image signal is stored separately.

* * * * *